(12) United States Patent
Zou et al.

(10) Patent No.: US 8,649,124 B2
(45) Date of Patent: Feb. 11, 2014

(54) DOUBLE SHELL WRITERS

(75) Inventors: Jie Zou, Eden Prairie, MN (US); David Seets, Shorewood, MN (US); James Wessel, Savage, MN (US); Jianhua Xue, Maple Grove, MN (US); Lixin Jia, Minneapolis, MN (US)

(73) Assignee: Seagate Technology LLC, Cupertino, CA (US)

( * ) Notice: Subject to any disclaimer, the term of this patent is extended or adjusted under 35 U.S.C. 154(b) by 17 days.

(21) Appl. No.: 12/966,453

(22) Filed: Dec. 13, 2010

(65) Prior Publication Data

US 2012/0147503 A1 Jun. 14, 2012

(51) Int. Cl.
*G11B 5/127* (2006.01)
*G11B 5/147* (2006.01)

(52) U.S. Cl.
USPC .............................. 360/125.26; 360/125.17

(58) Field of Classification Search
USPC .............. 360/125.16–125.26, 125.45, 125.5, 360/125.58, 125.63
See application file for complete search history.

(56) References Cited

U.S. PATENT DOCUMENTS

| 4,122,347 | A | * | 10/1978 | Kovalsky et al. | 250/423 R |
| 4,516,180 | A | * | 5/1985 | Narishige et al. | 360/125.5 |
| 4,799,118 | A | * | 1/1989 | Yamada et al. | 360/125.5 |
| 5,311,387 | A | * | 5/1994 | Mallary | 360/125.02 |
| 6,233,116 | B1 | * | 5/2001 | Chen et al. | 360/125.5 |
| 6,842,313 | B1 | | 1/2005 | Mallary | |
| 6,954,340 | B2 | * | 10/2005 | Shukh et al. | 360/317 |
| 7,057,853 | B2 | | 6/2006 | Okada et al. | |
| 7,233,457 | B2 | | 6/2007 | Johnston et al. | |
| 7,289,295 | B2 | | 10/2007 | Guan et al. | |
| 7,369,360 | B2 | | 5/2008 | Vas'ko et al. | |
| 7,542,233 | B2 | * | 6/2009 | Hirata et al. | 360/123.12 |
| 2002/0071208 | A1 | | 6/2002 | Batra et al. | |
| 2003/0002227 | A1 | * | 1/2003 | Jarratt | 360/319 |
| 2003/0210494 | A1 | * | 11/2003 | Campbell et al. | 360/125 |
| 2004/0004786 | A1 | * | 1/2004 | Shukh et al. | 360/126 |
| 2004/0027716 | A1 | * | 2/2004 | Chen et al. | 360/126 |
| 2004/0066576 | A1 | * | 4/2004 | Lee et al. | 360/126 |
| 2004/0252415 | A1 | * | 12/2004 | Shukh et al. | 360/317 |
| 2005/0128637 | A1 | * | 6/2005 | Johnston et al. | 360/125 |
| 2005/0259357 | A1 | * | 11/2005 | Kameda | 360/126 |
| 2006/0119982 | A1 | * | 6/2006 | Honjo et al. | 360/126 |
| 2007/0097546 | A1 | * | 5/2007 | Li et al. | 360/125 |
| 2007/0139819 | A1 | * | 6/2007 | Yazawa et al. | 360/126 |
| 2008/0165452 | A1 | * | 7/2008 | Bozeman et al. | 360/319 |
| 2009/0168260 | A1 | * | 7/2009 | Allen et al. | 360/319 |
| 2010/0188775 | A1 | * | 7/2010 | Macken et al. | 360/123.06 |
| 2011/0249360 | A1 | * | 10/2011 | Nunokawa et al. | 360/75 |

* cited by examiner

*Primary Examiner* — Wayne Young
*Assistant Examiner* — Adam B Dravininkas
(74) *Attorney, Agent, or Firm* — Alan G. Rego; Westman, Champlin & Koehler, P.A.

(57) ABSTRACT

An apparatus illustratively includes a return pole (RP) and a shield. The RP has a first RP magnetic layer, a second RP magnetic layer, and a RP non-magnetic layer. The RP non-magnetic layer separates and magnetically decouples the RP first and second magnetic layers. The shield has a first shield magnetic layer, a second shield magnetic layer, and a shield non-magnetic layer. The shield non-magnetic layer separates and magnetically decouples the shield first and second magnetic layers. A method illustratively includes generating magnetic flux and collecting the magnetic flux through an inner magnetic shell.

17 Claims, 11 Drawing Sheets

DOUBLE SHELL WRITERS

BACKGROUND

Certain data storage systems have recording heads that write information to recording media. In at least some data storage systems, a recording medium may store information in adjacent tracks that go from the center of the recording medium to the outer perimeter of the recording medium.

Occasionally, when a recording head is writing information to one particular track of a recording medium, the recording head has an undesirable effect on another track. For instance, one issue is known as side track erasure. In one particular example of side track erasure, a recording head is writing to a track, and it generates undesirable magnetic flux that alters information stored in one or more adjacent tracks or bits.

SUMMARY

In one embodiment, an apparatus includes a return pole (RP) and a shield. The RP has a first RP magnetic layer, a second RP magnetic layer, and a RP non-magnetic layer. The RP non-magnetic layer separates and magnetically decouples the RP first and second magnetic layers. The shield has a first shield magnetic layer, a second shield magnetic layer, and a shield non-magnetic layer. The shield non-magnetic layer separates and magnetically decouples the shield first and second magnetic layers.

In another embodiment, a recording head includes an outer magnetic shell, a write pole, and an inner magnetic shell. The inner magnetic shield is between the outer magnetic shell and the write pole. The non-magnetic layer magnetically decouples the inner and the outer magnetic shells.

In yet another embodiment, a method includes generating magnetic flux from a recording head magnetization coil and from a recording head yoke. The recording head magnetization coil flux and the recording head yoke flux are collected through an inner magnetic shell placed at least partially around the recording head magnetization coil and the recording head yoke.

These and various other features and advantages that characterize the claimed embodiments will become apparent upon reading the following detailed description and upon reviewing the associated drawings.

DETAILED DESCRIPTION

Embodiments of the present disclosure include recording heads that illustratively reduce or eliminate undesirable magnetic flux from reaching a recording medium. In an embodiment, this is accomplished by placing a double shell around the recording head writer. Double shells illustratively include two magnetic layers that are separated by a non-magnetic layer. The magnetic layer closest to the recording medium can be viewed as the outer shell, and the magnetic layer further away from the recording medium can be viewed as the inner shell. The inner shell and the non-magnetic layer capture and isolate some of the magnetic flux generated by the writer, preventing it from reaching the outer shell. As will be described in greater detail below, reducing the amount of or density of magnetic flux in the outer shell illustratively reduces the likelihood that undesirable magnetic flux will reach the recording medium. Accordingly, at least certain embodiments of the present disclosure help to prevent harmful effects of undesirable magnetic flux such as side track erasure.

Figure 1:
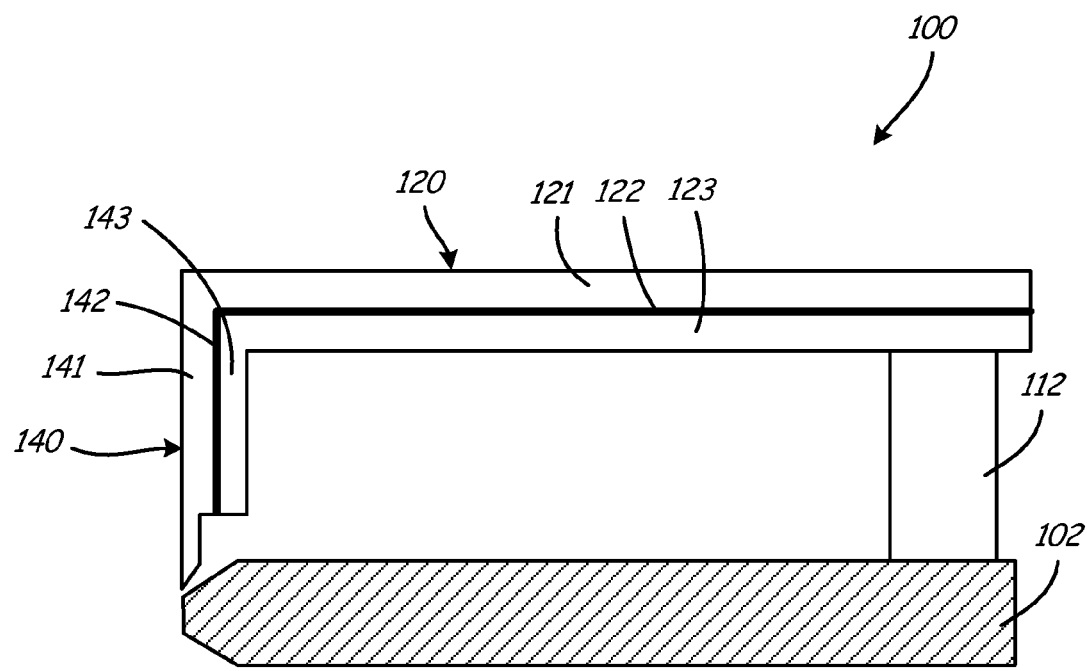
FIG. 1 is a cross-section of a double shell writer.

FIG. 1 is a cross-sectional view of one embodiment of a recording head 100 having a double shell writer. Recording head 100 includes a write pole 102, a via 112, and a return pole 120. As can be seen in the figure, return pole 120 has an outer shell 121, a non-magnetic layer 122, and an inner shell 123. Inner shell 123 and outer shell 121 are illustratively a magnetic material such as, but not limited to, NiFe alloys, CoFe alloys, or CoNiFe alloys. Recording head 100 optionally includes a shield 140 similarly having an outer shell 141, a non-magnetic layer 142, and an inner shell 143.

In an embodiment, shield outer shell 141 and return pole outer shell 121 form one continuous or approximately continuous piece of magnetic material. Shield inner shell 143 and return pole inner shield 123 form one continuous or approximately continuous piece of magnetic material, and shield non-magnetic layer 142 and return pole non-magnetic layer 122 form one continuous or approximately continuous piece of non-magnetic material. The continuous or approximately continuous layers included within embodiments are optionally formed simultaneously (e.g. at one electrochemical plating step). The continuous or approximately continuous layers could however be separately formed structures that contact each other or are otherwise magnetically coupled to each other.

The inner shell components described above (i.e. 123 and 143) can be viewed as the inner shell for head 100. The outer shell components (i.e. 121 and 141) can be viewed as the outer shell for head 100, and the non-magnetic layers (i.e. 122 and 142) can be viewed as a non-magnetic layer separating and magnetically decoupling the magnetic inner and outer shells.

Figure 2:
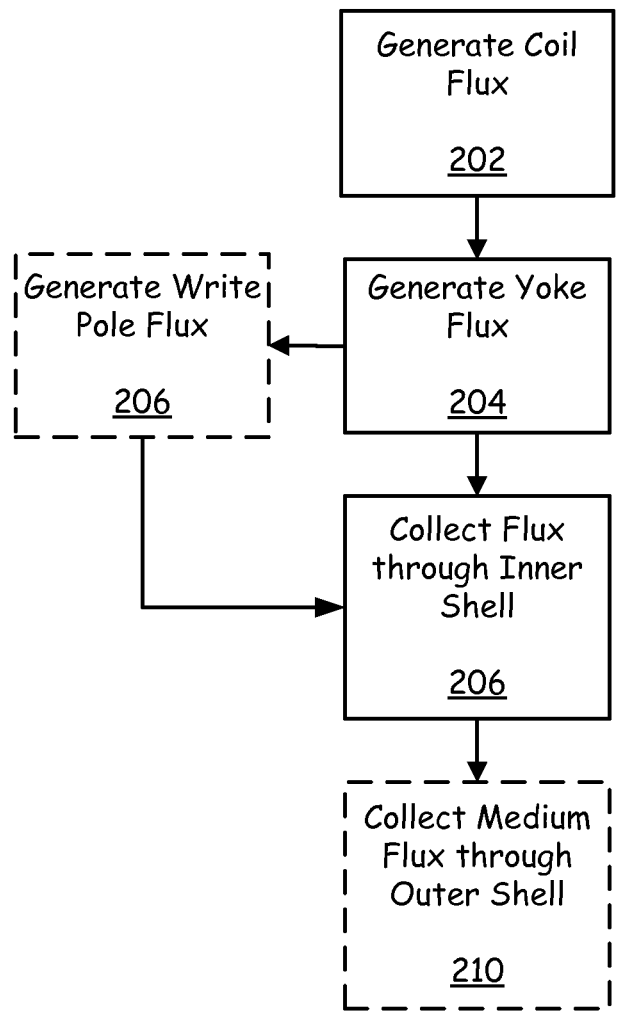
FIG. 2 is a method for collecting flux.

FIG. 2 is a flow chart of a method according to one embodiment of the present disclosure. At block 202, coil flux is generated. For instance, electric current may be passed through coils of a recording head to generate magnetic flux. At block 204, yoke flux is generated. Magnetic flux in a yoke may be generated by receiving flux from coils surrounding the yoke. At optional block 206, flux is optionally generated in a write pole. Flux in a write pole may be generated for example by receiving flux from a coil and/or yoke proximate to the write pole. At block 208, flux is collected through an inner shell. For instance, flux or a portion of the flux generated by coils and/or yokes may be collected through an inner shell of a recording head having a double shell writer. At optional block 210, flux from a medium is optionally collected through an outer shell. Magnetic flux utilized in a recording head writing process may for instance be collected through an outer shell.

Figure 3:
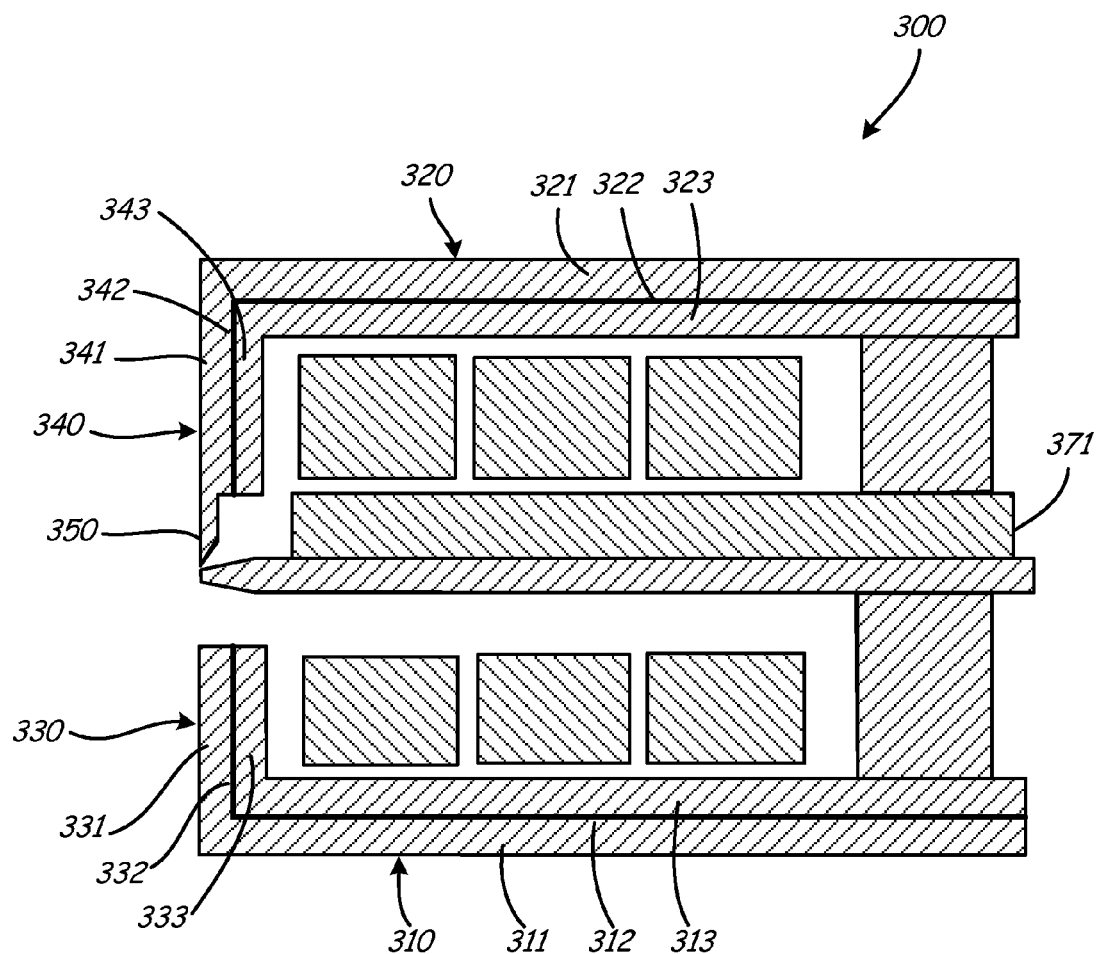
FIG. 3 is a cross-section of a double shell writer recording head with a trailing yoke.

FIG. 3 is a cross-sectional view of another embodiment of a recording head 300 having a double shell writer. As can be seen in the figure, first return pole 310 has an outer shell 311, a non-magnetic layer 312, and an inner shell 313. Inner shell 313 and outer shell 311 are illustratively a magnetic material such as, but not limited to, NiFe alloys, CoFe alloys, or CoNiFe alloys. Second return pole 320, leading shield (or leading edge shield) 330, and second trailing shield (or second trailing edge shield) 340 similarly have magnetic inner and outer shells, and non-magnetic layers separating the magnetic shells. More specifically, second return pole 320 has outer shell 321, non-magnetic layer 322, and inner shell 323. Leading shield 330 has outer shell 331, non-magnetic layer 332, and inner shell 333, and second trailing shield 340 has outer shell 341, non-magnetic layer 342, and inner shell 343.

In an embodiment, leading shield outer shell 331 and first return pole outer shell 311 form one continuous or approximately continuous piece of magnetic material. Leading shield non-magnetic layer 332 and first return pole non-magnetic layer 312 form one continuous or approximately continuous piece of non-magnetic material, and leading shield inner shell 333 and first return pole inner shell 313 for one continuous or approximately continuous piece of magnetic material. The continuous or approximately continuous layers included within embodiments are optionally formed simultaneously (e.g. at one electrochemical plating step). The continuous or approximately continuous layers could however be separately formed structures that contact each other or are otherwise magnetically coupled to each other.

Similarly, first trailing shield 350, second trailing shield outer shell 341, and second return pole outer shell 321 illustratively form one continuous or approximately continuous piece of magnetic material. Second trailing shield non-magnetic layer 342 and second return pole non-magnetic layer 322 form one continuous or approximately continuous piece of non-magnetic material, and second trailing shield inner shield 343 and second return pole inner shield 323 form one continuous or approximately continuous piece of magnetic material.

The inner shell components described above (i.e. 313, 323, 333, and 343) can be viewed as the inner shell for head 300. The outer shell components (i.e. 311, 321, 331, 341, and 350) can be viewed as the outer shell for head 300, and the non-magnetic layers (i.e. 312, 322, 332, and 342) can be viewed as the non-magnetic layer separating and magnetically decoupling the magnetic inner and outer shells.

Figure 4:
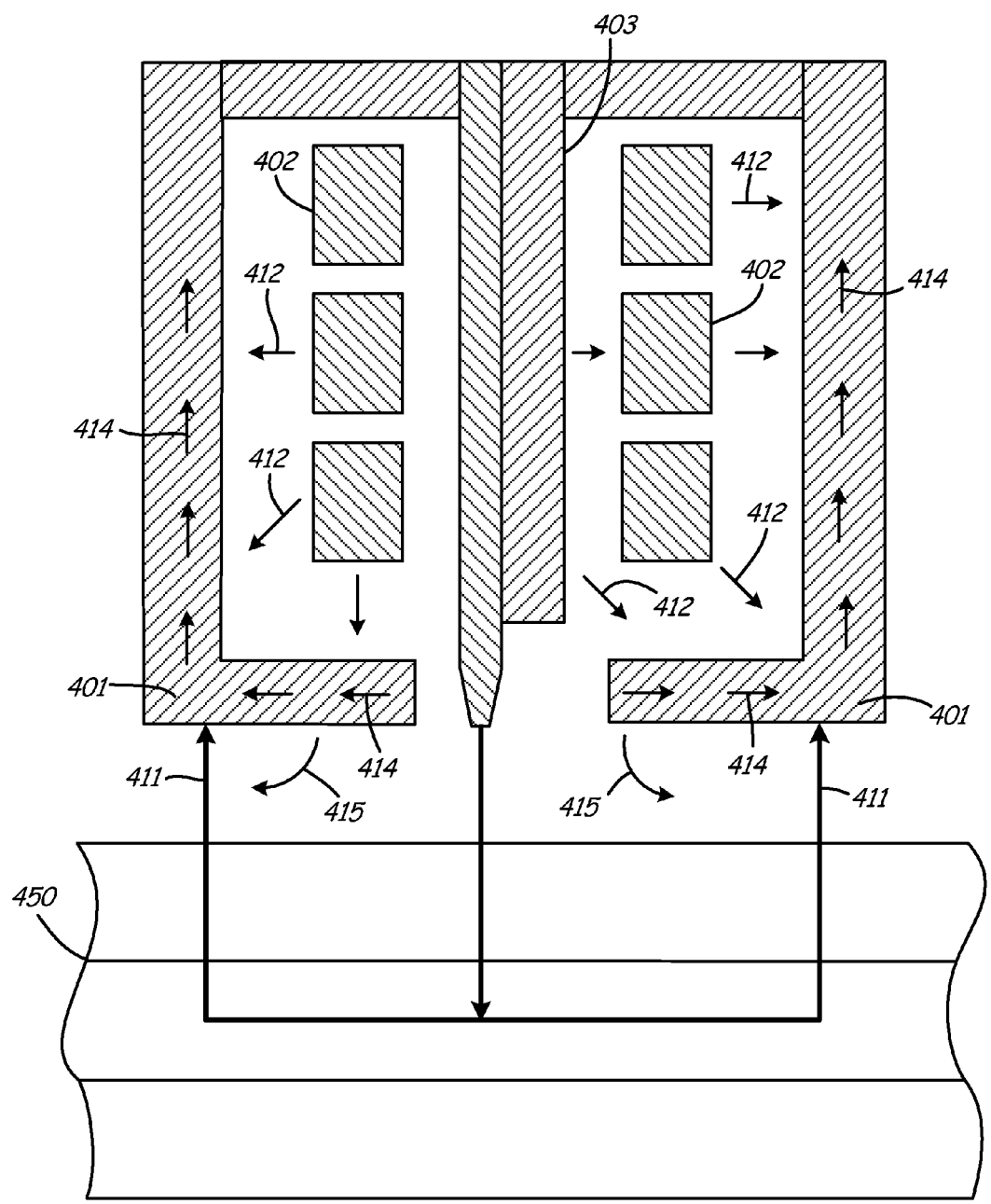
FIG. 4 is a schematic diagram of flux patterns in a single shell writer recording head.
Figure 5:
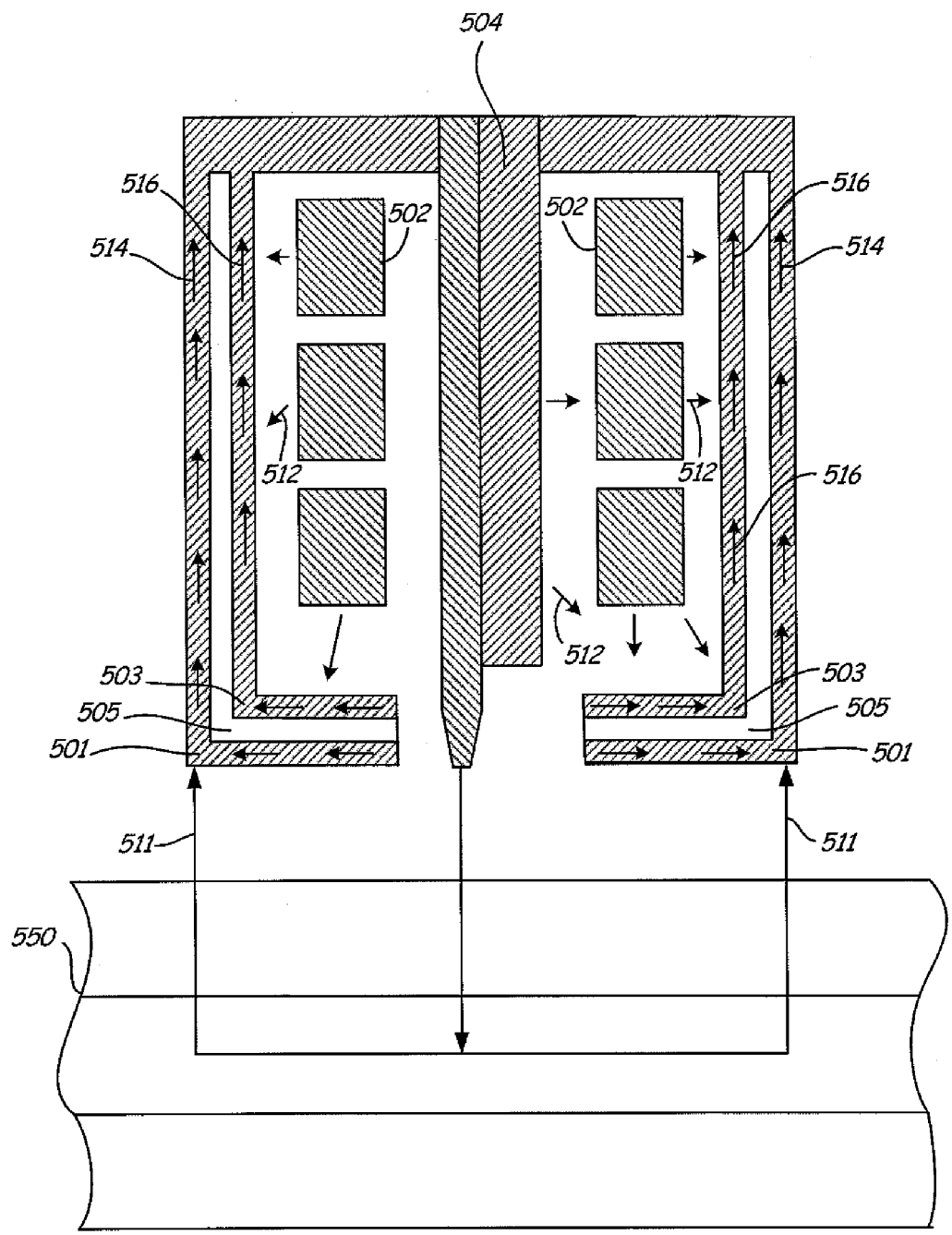
FIG. 5 is a schematic diagram of flux patterns in a double shell writer recording head.

Recording heads having two magnetic shells separated by a non-magnetic layer illustratively provide several advantages. One advantage is that they may reduce unwanted magnetic flux from being emitted from the recording head (e.g. flux that may cause side track erasures). FIGS. 4 and 5 help to illustrate one explanation for this reduction in unwanted magnetic flux.

FIG. 4 is a schematic diagram of flux patterns in a single shell writer. The single shell 401 collects flux from several sources. First, shell 401 collects flux 411 that is being returned from writing to the recording medium 450. Shell 401 also collects flux 412 that is emitted from magnetic coils 402 and/or yoke 403. This results in a relatively high density of flux in shell 401. The flux density in the single shell is represented by arrows 414.

FIG. 4 also shows erasing flux 415. Erasing flux 415 is illustratively unwanted flux that may lead to recording issues such as, but not limited to, side track erasure. Erasing flux 415 can be caused by several different mechanisms. One possible mechanism is physical imperfections in the shell. For example, flux traveling through a shell may encounter a manufacturing defect and be redirected outward towards a recording medium. Another possible mechanism involves domain walls. Due to a number of interactions that may take place in recording heads, domain walls may form in various components such as in return poles or shields. These domain walls create magnetic discontinuities that may also redirect flux traveling in a shell outward towards a recording medium.

FIG. 5 is a schematic diagram of flux patterns in a double shell writer. Flux 511 that is used to write to recording medium 550 is returned to outer shell 501. Flux 512 from magnetic coils 502 and/or yoke 504 however does not go to outer shell 501. Instead, flux 512 is collected by inner shell 503 and is isolated from outer shell 501 by non-magnetic layer 505. Accordingly, outer shell 501 illustratively has a lower density of flux, because it is not carrying both the flux 511 from the writing process and the coil/yoke flux 512. Outer shell 501 is only carrying flux 511 from the writing process. In FIG. 5, the flux being carried by outer shell 501 is represented by arrows 514, and the flux being carried by inner shell 503 is represented by arrows 516.

As was described previously, one possible cause of erasing flux, such as flux 415 in FIG. 4, is that flux in the outer shell is redirected by imperfections or domain walls in the shell. When a double shell writer is used, the amount of flux or the density of flux in the outer shell is reduced. This in turn reduces the likelihood of erasing flux. For instance, if there is less flux in the outer shell, when flux encounters an imperfection or a domain wall, there is a smaller fringe field to erase the media.

Another benefit of double shell writers is that they may be able to provide a stronger writing field. For instance, the strength of the writing field generally increases when either the distance between the yoke and the write pole tip, or the distance between the coils and the write pole tip decreases. One factor that has limited how short these distances can be has been erasure flux. Decreasing either the yoke-to-write pole tip distance or the coils-to-write pole tip distance also decreases the distances between the yoke and/or coils to the shields. These decreased distances to the shields have generally resulted in increased erasure flux. However, with double shells, both coils and/or yokes individually or in combination can be brought closer to the shields and hence closer to the write pole tip without resulting in increased erasure flux. The potential erasure flux associated with shorter distances is taken away and isolated by the inner shell and the non-magnetic layer. Additionally, in a somewhat related fashion, another advantage of double shell writers is that it permits a greater variety of positioning of coils and/or yokes. This may be beneficial from a design perspective or from a manufacturing perspective. For instance, it could allow for different positioning of components within a recording head or allow for less stringent alignment requirements in manufacturing (e.g. looser layer-to-layer registration requirements).

Yet another advantage of double shell writers is that the magnetic/non-magnetic/magnetic tri-layer structure reduces the self-demagnetization field at the edges of the first leading shield and the second trailing shield. The demagnetization field at the edges is one of the main causes for magnetic domain formation. Therefore, double shell writers reduce the occurrence of magnetic domains and thus further reduce the side track erasure risk due to that magnetic flux redirects toward media at domain walls.

Figure 6:
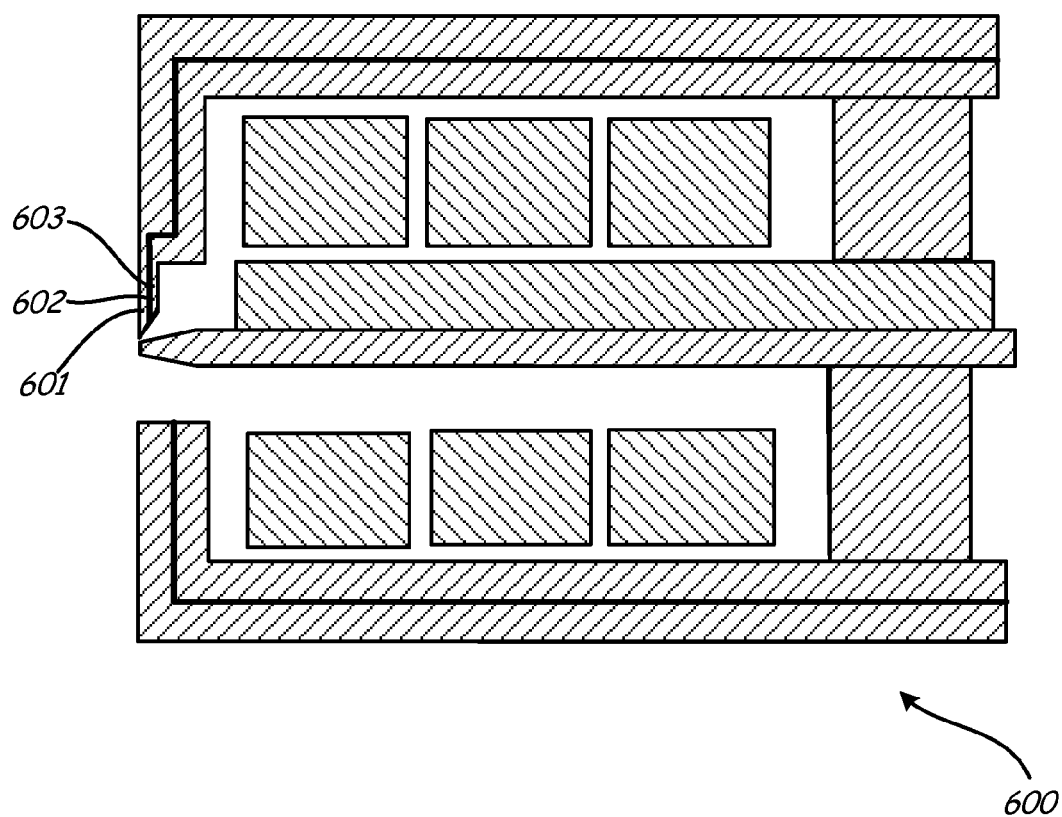
FIG. 6 is a cross-section of a double shell writer recording head that has a three piece first trailing shield.
Figure 7:
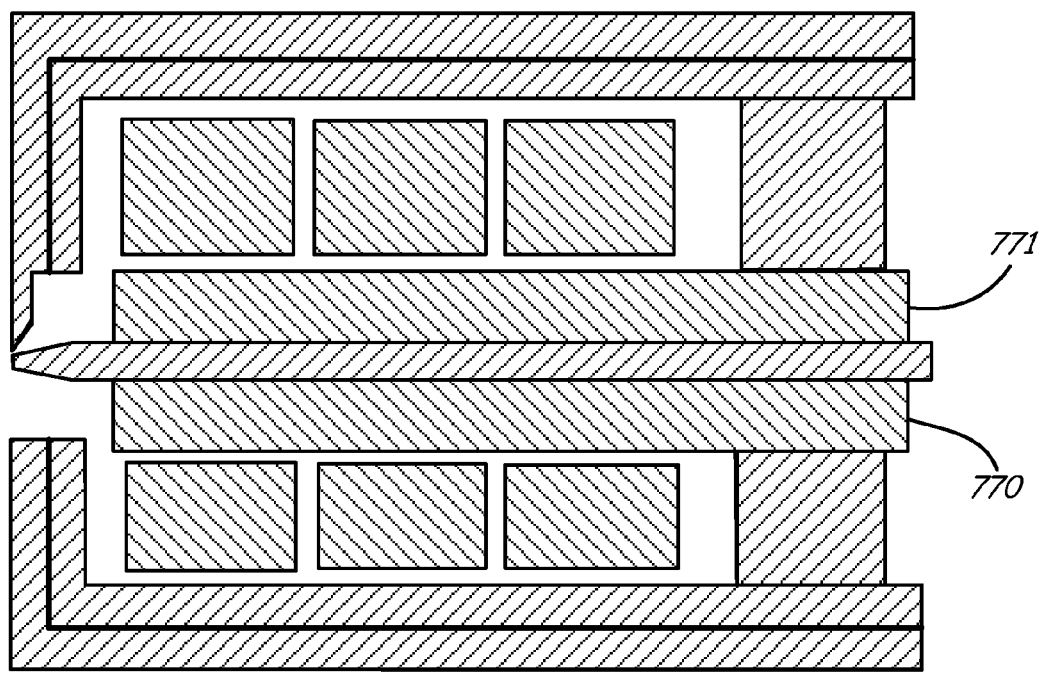
FIG. 7 is a cross-section of a double shell writer recording head with a split yoke.
Figure 8:
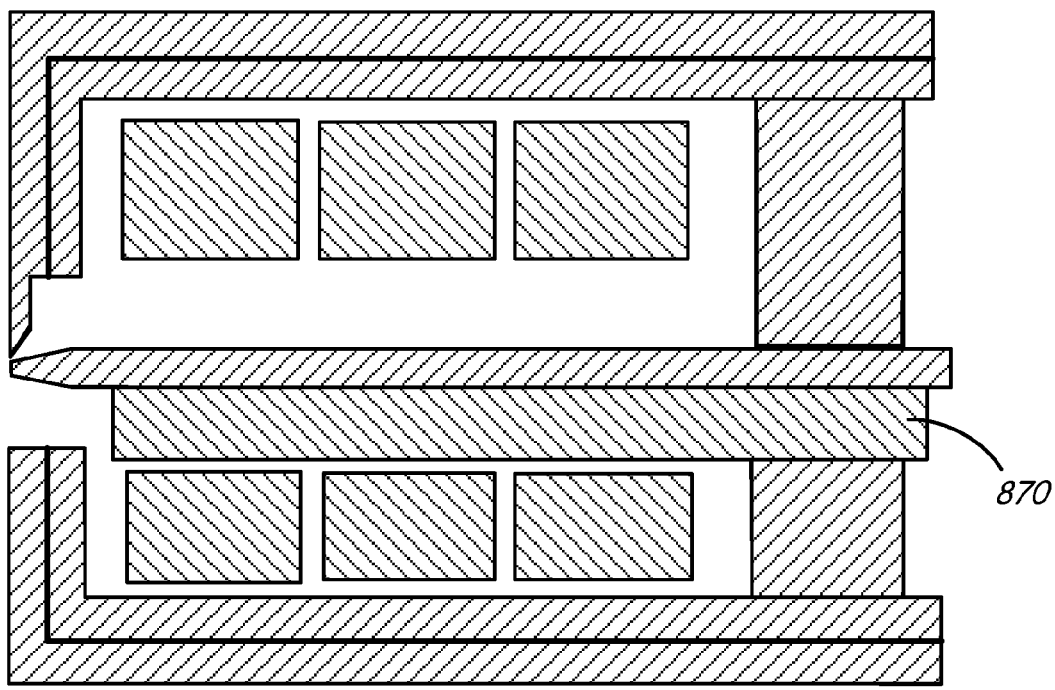
FIG. 8 is a cross-section of a double shell writer recording head with a leading yoke.

FIGS. 6, 7, and 8 show cross-sectional views of some other embodiments of double shell writers. Writer 600 in FIG. 6 is similar to that shown in FIG. 3 except that the first trailing shield is comprised of three pieces instead of just a single piece. Writer 600 has a first trailing shield outer shell 601, a first trailing shield inner shell 603, and a non-magnetic layer 602 separating shells 601 and 603. It is worthwhile to point out that any combination of one or more of leading shields, first trailing shields, second trailing shields, first return poles, and second return poles can be made to include or to not include a double shell design. Embodiments that have a double shell design on any one or more components illustratively reduce erasure flux.

The cross-sections shown in FIGS. 7 and 8 are similar to the cross-section shown in FIG. 3, but the cross-sections differ in the types of yokes used in the writers. The writer in FIG. 3 is shown as having a trailing edge yoke 371, the writer in FIG. 7 is shown as having a leading edge yoke 770 and a trailing edge yoke 771 (i.e. a split yoke), and the writer in FIG. 8 is shown as having a leading edge yoke 870. As is indicated by the figures, embodiments of recording heads having double shells are not limited to any specific recording head design. For example, embodiments illustratively include any type of yokes, write poles, coils, vias, or shields.

Figure 9:
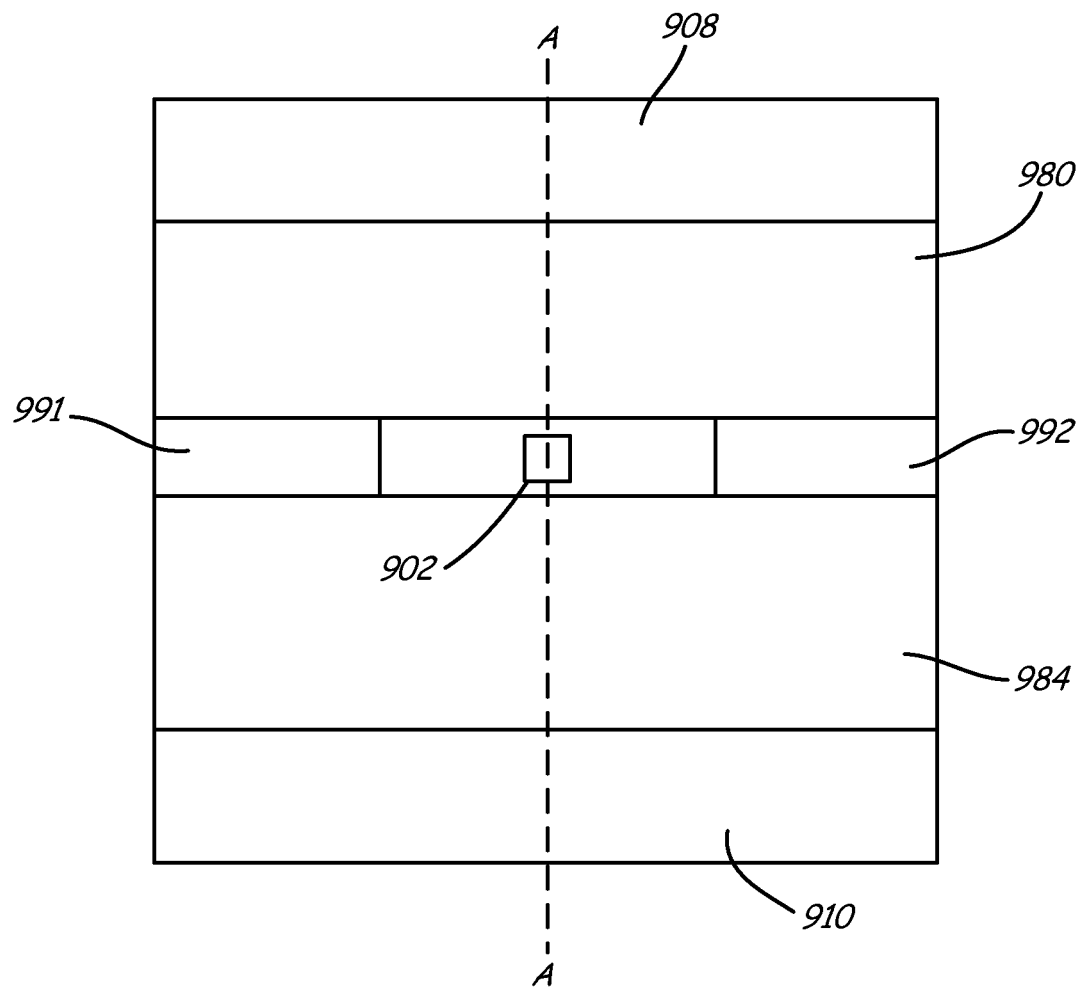
FIG. 9 is a view of a double shell writer recording head from the air-bearing surface side.

FIG. 9 shows an embodiment of a recording head according to the present disclosure from the air-bearing surface side (i.e. the side facing the recording medium). FIG. 9 shows a cross-sectional line A-A. The cross-sectional views in FIGS. 2, 3, 4, 5, 6, 7, and 8 have been from the perspective of line A-A in FIG. 9. FIG. 9 includes several of the features shown in the other figures such as a first return pole 908, a second return pole 910, a leading shield 980, a trailing shield 984, and a write pole 902. FIG. 9 also shows a first side shield 991 and a second side shield 992. Embodiments of double shell writers illustratively include one or more side shields, and the side shields are optionally incorporated within the double shell design. For instance, one or both of side shields 991 and 992 illustratively include a magnetic outer layer that forms part of an outer shell, a magnetic inner layer that forms part of an inner shell, and a non-magnetic layer that separates the inner and outer shells. Alternatively, side shields 991 and 992 comprise one magnetic layer and are part of either an inner shell or an outer shell.

Figure 10:
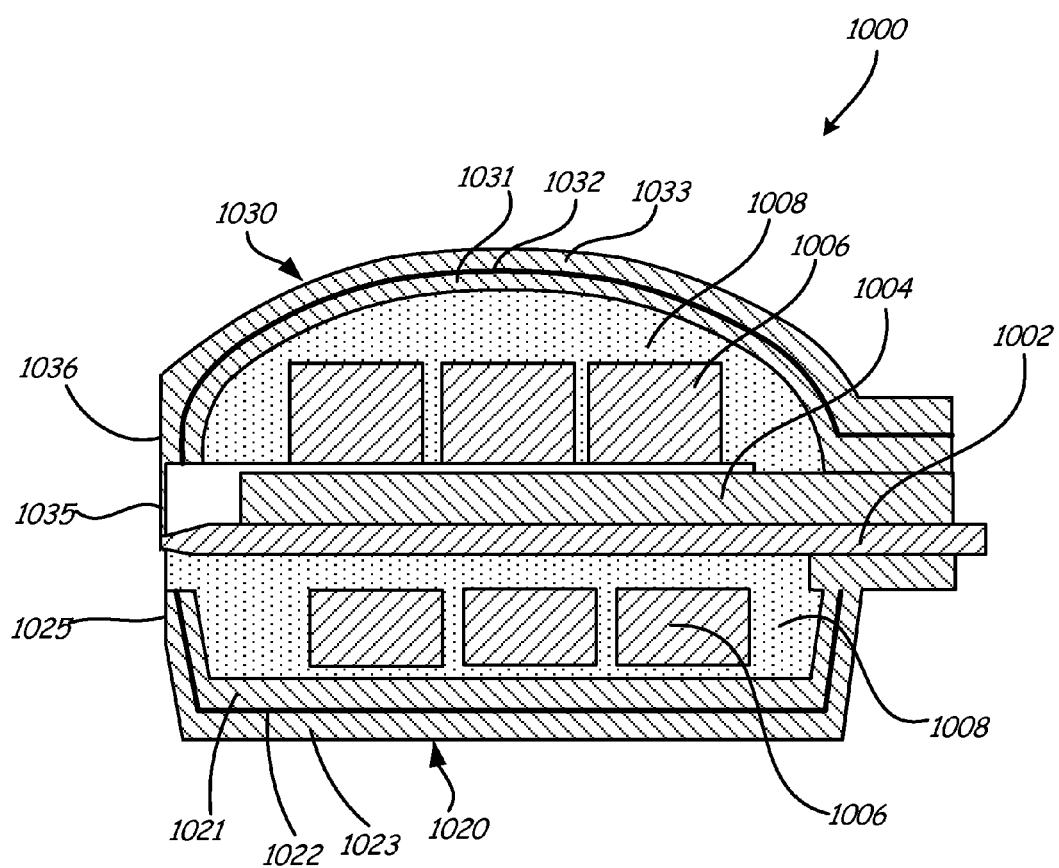
FIG. 10 is a cross-section of another embodiment of the double shell writer.
Figure 11:
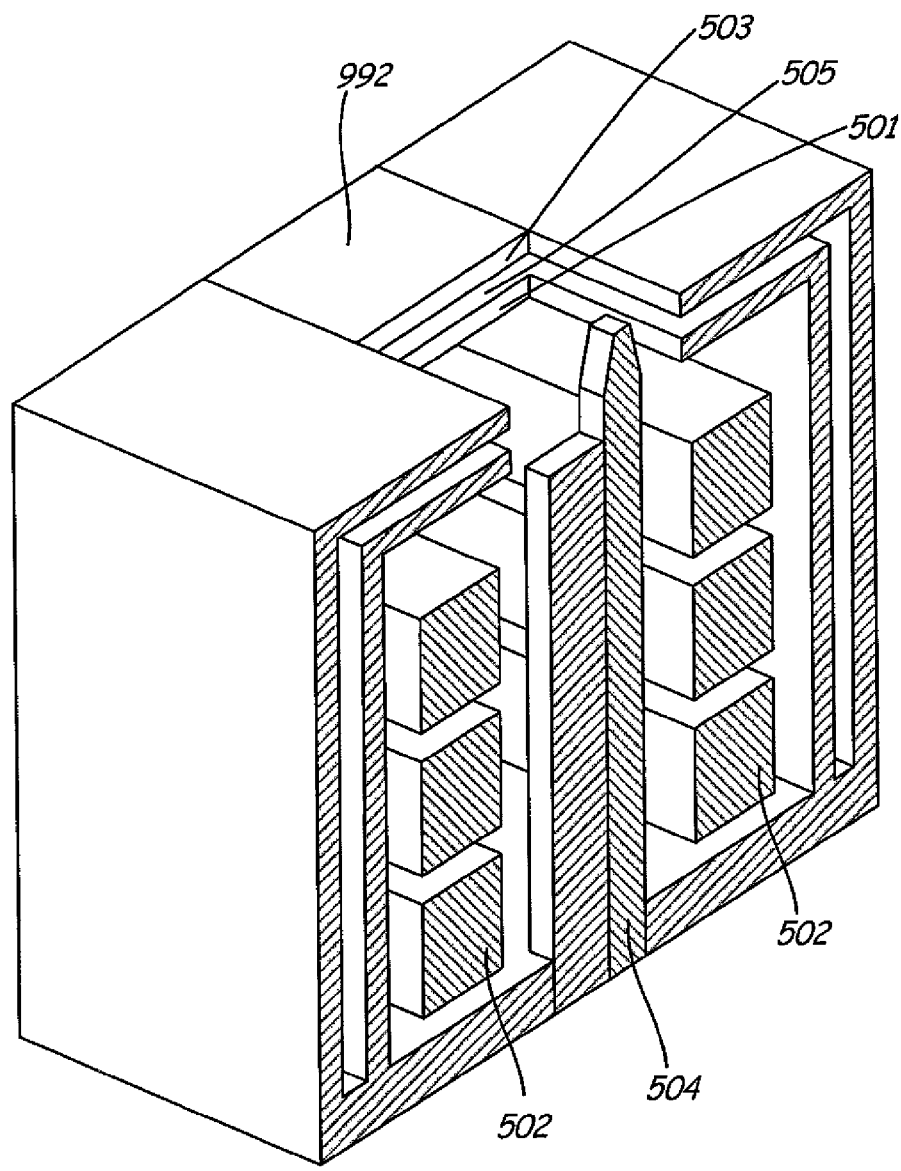
FIG. 11 is an isometric view of a portion of a double shell writer in accordance with one embodiment.

FIG. 10 is a cross-sectional view of another embodiment of a double shell writer 1000. Writer 1000 optionally includes a write pole 1002, a yoke 1004, coils 1006, insulating layers 1008, a first return pole 1020, and a second return pole 1030. First return pole 1020 includes a leading shield 1025. First return pole 1020 and leading shield 1025 illustratively includes a first magnetic layer 1021, a non-magnetic layer 1022, and a second magnetic layer 1023. Second return pole 1030 includes a first trailing shield 1035 and a second trailing shield 1036. Second return pole 1020 and second leading shield 1036 illustratively include a first magnetic layer 1031, a non-magnetic layer 1032, and a second magnetic layer 1033. First leading shield 1035 illustratively includes second magnetic layer 1033, but not first magnetic layer 1031 or non-magnetic layer 1032. As can be seen in the figure, neither the first return pole non-magnetic layer 1022 nor the second return pole non-magnetic layer 1032 is exposed at the air-bearing surface side of the recording head. Instead, each non-magnetic layer is covered by its respective outer magnetic shell. This may prevent erasure flux from escaping out to the recording medium.

As has been described above, embodiments of the present disclosure include recording head writers that have double shells. The double shells are made from tri-layers of two magnetic layers separated by a non-magnetic layer. The inner magnetic layer captures stray magnetic flux such as flux emitted by the coils and/or yoke. The non-magnetic layer magnetically decouples the inner and outer magnetic layers, thus decreasing the amount of flux in the outer shell. For example, the outer layer illustratively only carries the flux that is returned from writing to the recording media. This reduces the amount of flux in the outer shield which may reduce the likelihood of generating erasure flux. Additionally, in at least certain embodiments of double shell writers, the non-magnetic layers are covered by the outer magnetic layers such that no portions of the non-magnetic layers are exposed at the air-bearing surface side. This also illustratively reduces the likelihood of erasure flux by keeping the flux contained within the double shell.

Finally, it is to be understood that even though numerous characteristics and advantages of various embodiments have been set forth in the foregoing description, together with details of the structure and function of various embodiments, this detailed description is illustrative only, and changes may be made in detail, especially in matters of structure and arrangements of parts within the principles of the present disclosure to the full extent indicated by the broad general meaning of the terms in which the appended claims are expressed. In addition, although the embodiments described herein are directed to hard disc drives, it will be appreciated by those skilled in the art that the teachings of the disclosure can be applied to other types of data storage systems, without departing from the scope and spirit of the disclosure.

What is claimed is:

1. An apparatus comprising:
   a return pole (RP) having a first RP magnetic layer, a second RP magnetic layer, and a RP non-magnetic layer, the RP non-magnetic layer separating and magnetically decoupling the RP first and second magnetic layers; and
   a shield having a first shield magnetic layer, a second shield magnetic layer, and a shield non-magnetic layer, the shield non-magnetic layer separating and magnetically decoupling the shield first and second magnetic layers, the shield first magnetic layer and the RP first magnetic layer forming a continuous piece of magnetic material that is interposed in between a bearing surface of the apparatus and the non-magnetic layers,
   wherein the first shield magnetic layer, the second shield magnetic layer and the shield non-magnetic layer are parallel to the bearing surface in a portion of the apparatus where the first shield magnetic layer is interposed between the bearing surface and the shield non-magnetic layer.

2. The apparatus of claim 1, wherein the return pole first magnetic layer and the shield first magnetic layer are magnetically coupled to form a portion of an outer shell, wherein the return pole second magnetic layer and the shield second magnetic layer are magnetically coupled to form a portion of an inner shell, wherein the return pole non-magnetic layer and the shield non-magnetic layer separate and magnetically decouple the portion of the inner shell and the portion of the outer shell, and wherein the return pole and the shield non-magnetic layers form a continuous piece of non-magnetic material that is covered by the outer shell.

3. The apparatus of claim 2, further comprising:
   a second return pole having a first magnetic layer, a second magnetic layer, and a non-magnetic layer, the second return pole non-magnetic layer separating and magnetically decoupling the second return pole first and second magnetic layers; and a second shield having a first magnetic layer, a second magnetic layer, and a non-magnetic layer, the second shield non-magnetic layer separating and magnetically decoupling the second shield first and second magnetic layers.

4. The apparatus of claim 3, wherein the second return pole first magnetic layer and the second shield first magnetic layer are magnetically coupled to form a second portion of the outer shell, wherein the second return pole second magnetic layer and the second shield second magnetic layer are magnetically coupled to form a second portion of the inner shell, and wherein the second return pole non-magnetic layer and the second shield non-magnetic layer separate and magnetically decouple the second portion of the inner shell and the second portion of the outer shell.

5. The apparatus of claim 4, wherein the shield is a leading edge shield, and wherein the second shield is a trailing edge shield.

6. The apparatus of claim 5, further comprising:
a second trailing edge shield.

7. The apparatus of claim 6, wherein the second trailing edge shield has a first magnetic layer, a second magnetic layer, and a non-magnetic layer, the second trailing edge shield non-magnetic layer separating and magnetically decoupling the second trailing shield first and second magnetic layers.

8. The apparatus of claim 4, further comprising:
at least one side shield between the shield and the second shield.

9. The apparatus of claim 8, wherein the at least one side shield has a first magnetic layer, a second magnetic layer, and a non-magnetic layer, the at least one side shield non-magnetic layer separating and magnetically decoupling the at least one side shield first and second magnetic layers.

10. A recording head comprising:
an outer magnetic shell;
a write pole;
an inner magnetic shell between the outer magnetic shell and the write pole;
a bearing surface; and
a non-magnetic layer that magnetically decouples the inner and the outer magnetic shells, and that is separated from the bearing surface by the outer magnetic shell that is interposed directly between the bearing surface and the non-magnetic layer, wherein the inner magnetic shell is separated from the bearing surface by the outer magnetic shell and the non-magnetic layer, and wherein no portion of either the inner magnetic shell or the non-magnetic layer is exposed at the bearing surface.

11. The recording head of claim 10, further comprising:
a leading yoke between the write pole and the inner magnetic shell.

12. The recording head of claim 10, further comprising:
a trailing yoke between the write pole and the inner magnetic shell.

13. The recording head of claim 10, further comprising:
a split yoke between the write pole and the inner magnetic shell.

14. The recording head of claim 10, further comprising:
a shield having an inner magnetic layer, an outer magnetic layer, and a non-magnetic layer, the non-magnetic layer being in between the shield inner and outer magnetic layers.

15. An apparatus comprising:
a recording head magnetization coil;
a recording head yoke;
a bearing surface; and
a multi-layered structure, parallel to the bearing surface, configured to collect magnetization coil flux and yoke flux, the structure being placed at least partially around the recording head magnetization coil and the recording head yoke, wherein only one layer of the multi-layered structure is exposed at the bearing surface, and wherein the multi-layered structure comprises an inner shell, an outer shell and a non-magnetic layer between the inner shell and the outer shell, the outer shell being the only one layer exposed at the bearing surface, and wherein the inner shell, the non-magnetic layer and the outer shell are interposed between the recording head magnetization coil and the bearing surface in a portion of the multi-layered structure that is parallel to the bearing surface.

16. The apparatus of claim 15, wherein the inner and the outer shells include portions of a return pole.

17. The apparatus of claim 15, wherein the inner and the outer shells include portions of a shield that comprises layers parallel to the bearing surface.

* * * * *